United States Patent [19]

Wright

[11] 4,328,301

[45] May 4, 1982

[54] STRIPPING LAYERS IN DIFFUSION TRANSFER FILM

[75] Inventor: Peter J. Wright, Ilford, England

[73] Assignee: Ciba-Geigy AG, Basel, Switzerland

[21] Appl. No.: 188,428

[22] Filed: Sep. 18, 1980

[30] Foreign Application Priority Data

Oct. 12, 1979 [GB] United Kingdom ............ 35519/79

[51] Int. Cl.³ .................... G03C 1/99; G03C 11/12
[52] U.S. Cl. .................................. 430/215; 430/202; 430/211; 430/227; 430/263; 430/642
[58] Field of Search ............. 430/202, 215, 228, 262, 430/263, 642, 227

[56] References Cited

U.S. PATENT DOCUMENTS

| | | | |
|---|---|---|---|
| 2,525,753 | 10/1950 | Yutzy et al. | 430/642 |
| 3,043,695 | 7/1962 | Alles | 430/263 |
| 3,445,228 | 5/1969 | Beavers et al. | 430/215 |
| 3,573,907 | 4/1971 | Verelst | 430/262 |

*Primary Examiner*—Richard L. Schilling
*Assistant Examiner*—John L. Goodrow
*Attorney, Agent, or Firm*—Sprung, Horn, Kramer & Woods

[57] ABSTRACT

A photographic assembly for the photographic diffusion transfer process is provided wherein a stripping layer is used consisting of a graft copolymer of gelatin which has been substantially fully reacted with a dicarboxylic acid anhydride selected from phthalic anhydrides, succinic anhydrides, glutaric anhydrides and a monomer of a vinyl ester, a vinyl ether, an acrylic ester, an acrylic ether, a methacrylic ester or a methacrylic ether or a mixture thereof. These stripping layers exhibit good dry adhesion to the emulsion layer and to the mordant layer and moderate wet adhesion.

8 Claims, No Drawings

STRIPPING LAYERS IN DIFFUSION TRANSFER FILM

This invention relates to photographic material which comprises a stripping layer.

Photographic stripping film material is well known and has been produced for many years for use in such processes as photomontage, screen printing and photoresists for etching of cylinders for photogravure. Such stripping film usually comprises a dimensionally stable temporary support, a stripping layer, a hydrophobic permanent support and a silver halide emulsion layer. After exposure and development a further step is usually required to separate the permanent support which carries the photographic image from the temporary support. Such stripping layers are intended to hold together two at least partially hydrophobic layers that is to say the temporary support and the permanent support.

However in recent years various diffusion transfer processes have been described in which there is present in the photographic assembly as exposed to light at least one silver halide emulsion layer, a layer in which an image is formed by imagewise diffusion of a substance or substances from the silver halide emulsion layer or layers and a support base. It is often required that a stripping layer is present between the silver halide emulsion layer or layers and the image layer. After the diffusing substance has passed from the silver halide layer or layers to the image layer the silver halide containing portion of the photographic assembly is separated from the image layer and base at the stripping layer. The stripping effect is conveniently activated during the processing of the photographic material.

Photographic materials of this type which comprise at least one silver halide emulsion layer, a stripping layer, an image layer and a support are described in British patent specification No. 1,362,017 and in British patent application No. 2,007,378A. In the first case processing is carried out in aqueous alkaline conditions and dyes diffuse from the silver halide layer to the image layer. In the second case processing is carried out in aqueous acidic conditions and an image dye modifying/silver halide developing (dymodev) compound diffuses from the silver halide layer to the image layer. The requirements of a stripping layer in material as described in both these specifications are that the photographic material should exhibit very good dry adhesion so that it does not separate before it is required to do so and that it should exhibit moderate wet adhesion but not such strong adhesion that the material does not separate after processing in aqueous conditions for a predetermined period of time. It is of course necessary that all the diffusion of the diffusible substance has occurred before the material separates. Further it is required that the stripping layer is permeable to the diffusible substances in the appropriate acidic or alkaline conditions. It has proved difficult to find a stripping layer which fulfils all these desiderata and in particular which exhibits enough wet adhesion to enable complete diffusion of the diffusible substances to take place but which nevertheless loses adhesion when the material is processed using aqueous processing solutions.

According to the present invention there is provided a photographic assembly which comprises at least one photosensitive layer and an image layer in which after exposure and processing an image is formed by an imagewise diffusion of a substance or substances from the photosensitive layer or layers or a layer in operative contact therewith and a support, there being present between the photosensitive layer or layers and the said image layer a stripping layer consisting of a graft copolymer of gelatin which has been substantially fully reacted with a dicarboxylic acid anhydride selected from phthalic anhydrides, succinic anhydrides and glutaric anhydrides and a monomer of a vinyl ester, a vinyl ether, an acrylic ester, an acrylic ether, a methacrylic ester or a methacrylic ether or a mixture thereof, the proportion of reacted gelatin to monomer in the graft copolymer being from 1 gelatin to 0.25 monomer by weight to 1 gelatin to 1.5 monomer by weight, there being optionally other layers present in the photographic assembly between the lowest photosensitive layer and the image layer, the said stripping layer being present between two gelatin based layers.

Suitable photosensitive layer or layers are gelatin based and also the image layer is gelatin based. In fact preferably all the layers in the assembly are gelatin based except for the support base.

Most preferably the photosensitive layer is a gelatino silver halide emulsion layer.

By layer in operative contact with the photosensitive layer is meant a layer close enough to the photosensitive layer to receive an imagewise diffusion of substance from the photosensitive layer and as a result release imagewise a diffusible substance.

A very large number of diffusion transfer processes have been proposed and some commercialised which could make use of the photographic assembly of the present invention. That is to say, diffusion transfer processes in which a stripping layer is required. In some diffusion transfer processes a dye is released from a silver halide emulsion layer by a colour development process, this dye passes through a stripping layer to an image receiving layer. Such a process is described for example in British Pat. No. 1,187,502.

Another dye diffusion process is described in British patent application No. 2,017,950. In this case an azo dye link is split to release a diffusible dye. In other processes a so-called dye-developer is used. In the areas where the silver halide has been exposed the dye-developer reduces the exposed silver halide and is itself immobilised whilst in the non-exposed areas the dye-developer under the action of an alkaline medium diffuses to a receiving layer. Such a process is described in U.S. Pat. No. 3,362,819.

Examples of layers which may be present between the lowest silver halide emulsion layer and the image layer include an opacifying layer and a light reflecting layer.

The stripping action of the stripping layer in the photographic assembly of the present invention is an adhesion failure at the interface between the face of the stripping layer and the face of one of two layers which are coated in contact with the stripping layer. When stripping has been effected the complete stripping layer will be present on one side of the two portions into which the assembly divides, that is to say one portion which comprises the support base and the image layer and the other portion which comprises the silver halide emulsion layer or layers. Thus the stripping layer of use in the present invention works in a different manner from the stripping layers described as being of use in British patent specification No. 1,362,017. The stripping layers proposed to be used therein are mostly water soluble or at least water softenable. Use of such layers gives rise to difficulties in practice because of dissolved and partially dissolved colloid present in the processing bath and on the processed separated photographic material. In published U.K. patent application No. 2,007,378 the use of phthalated gelatin alone for the stripping layer is described. In practice it has been found that although phthalated gelatin can be used as the stripping layer it is not especially satisfactory as stripping layers composed thereof exhibit both low dry adhesion and low wet adhesion. This is shown in the accompanying Example.

Gelatin layers in photographic assemblies adhere firmly one to another because of cross-linking across their interfaces by hardening agents added in the coating compositions. It is thought that cross-linking occurs via the primary amino groups which are present in the gelatin. Thus it is important that all the primary amino groups in the gelatin used in the stripping face in the present invention are blocked by the gelatin being fully reacted with glutaric, phthalic or most preferably succinic anhydride. The presence of the monomer units in the graft polymer helps to provide good dry adhesion between the stripping layer and the gelatin based layers on either side thereof. Their presence also provides wet adhesion up to a certain point, but when the stripping layer has absorbed a certain amount of processing liquid adhesion between one of the gelatin layers and the stripping layer is greatly lessened and they can easily be stripped.

Synthetic polymer layers can not usually be used as stripping layers because they do not absorb the processing solution and they do not permit readily the diffusion of the diffusible substances therethrough. Also polymers would be very difficult to coat because they do not gel on cooling. However the graft polymers of use in the stripping layers of the present invention can be coated as aqueous coating compositions in a manner similar to gelatin. They gel on cooling and they readily absorb the processing liquid but do not swell very much and this aids the adhesion failure. Further the diffusible substances readily pass through a stripping layer made therefrom.

The content of the gelatin layers which are coated adjacent to the stripping layer determines to some extent at which of these layers adhesion failure will occur. For example if one of the layers is a gelatino silver halide emulsion layer then it is most likely that adhesion failure will occur at the interface between the gelatino silver halide emulsion layer and the stripping layer.

If the contents of the gelatin layer on the silver halide emulsion portion of the assembly are such that the stripping layer on separation will remain attached to the image portion of the assembly then it is possible to use the stripping layer as an ordinary layer of the assembly, as for example a light reflecting layer, a timing layer or a scavenging layer by incorporation of appropriate ingredients in this layer.

However by use of the graft polymers as hereinbefore defined as the stripping layer it is possible to provide very thin transparent layers, e.g. 0.5 microns thick. Such layers are not visible on the portion of the photographic assembly to which they remain attached.

The dicarboxylic acid anhydrides used to prepare the modified gelatin may be substituted as shown in the following formulae:
succinic anhydride

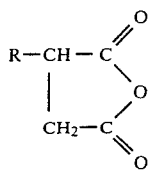

(I)

phthalic anhydride

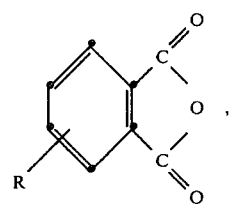

(II)

glutaric anhydride

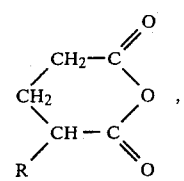

(III)

wherein the above three formulae R denotes hydrogen, alkyl, halogen or —SO$_3$M, wherein M is hydrogen or an alkali metal ion.

Preferred alkyl groups contain 1 to 4 carbon atoms. Suitable radicals are methyl, ethyl, propyl or butyl. Methyl and ethyl are preferred. Suitable halogens are fluorine, chlorine or bromine. Preferably chlorine or bromine are used. M is hydrogen or an alkali metal ion such as Na$^\oplus$ or K$^\oplus$. Na$^\oplus$ is preferred.

The gelatin may be modified by use of the acid anhydrides according to the method of Yutzy et al, U.S. Pat. No. 2,525,753 or Habeeb et al, Biochimica et Biophysica acta, 29, 587 (1958).

Monomers of particular use in the preparation of the graft copolymers of use in the stripping layer of the present invention are:
vinyl esters of the formula

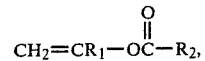

vinyl ethers of the formula $CH_2=CR_1-OR_2$,
acrylic esters of the formula

or methacrylic esters of the formula

wherein R$_1$ is hydrogen or methyl and R$_2$ is alkyl having from 1 to 4 carbon atoms or an aromatic ring.

In suitable monomers R$_2$ denotes e.g. methyl, ethyl, n-propyl, n-butyl or phenyl.

Particularly preferred monomers are n-butyl acrylate (nBA), n-butylmethacrylate (nBMA), vinyl acetate and vinyl benzoate.

The glass transition temperature (Tg) of the homopolymer of the monomers of use in the present invention dictates to some extent the wet adhesion capabilities of the graft polymers. In general the lower the Tg the greater the adhesion. For example polybutyl acrylate has a Tg of −54° C. whilst vinyl acetate has a Tg of 32° C. It is shown in the Example that graft polymers which comprise n-butyl acrylate exhibit greater wet adhesion than graft polymers which comprise vinyl acetate. Thus a required wet adhesion can be achieved by a suitable selection of monomers or mixture of monomers. The use of monomers having a Tg over 40° C. is to be avoided as graft polymers containing such monomers tend to be brittle.

Any of the usual initiators used to prepare graft copolymers may be used, for example:
2,2′-azobis-(2-methylpropionitrile),
4,4′-azobis-(4-cyanovaleric acid),
Potassium persulphate and ammonium persulphate.

The modified gelatins used in the preparation of the graft copolymers used in the Examples were prepared as follows. Parts and percentages are by weight.

(1) Preparation of phthalated gelatin 150 g of gelatin are dissolved in 1.5 liters of distilled water contained in a flask fitted with a stirrer, thermometer, pH electrodes and a dropping funnel. The flask stands in a water bath maintained at 40° C. The pH is adjusted to 9.0 with a 10% solution of sodium hydroxide. 23 g of phthalic anhydride dissolved in a minimum of acetone is then added over a period of 25 minutes from the dropping funnel. The pH is maintained at 8.5 to 9.5 throughout this period by addition of 10% sodium hydroxide solution. After the addition is complete the solution is stirred for a further 40 minutes at 40° C., transferred to a dialysis bag and dialysed for 48 hours at 35° C.

(2) Preparation of succinylated gelatin 300 g of gelatin are dissolved in 3 liters of distilled water, and treated with 30 g of succinic anhydride dissolved in 160 ml of acetone in exactly the same way as in the above preparation and again purified by dialysis.

The following test is used to show that substantially all the free —NH$_2$— groups in the gelatin have been reacted with the acid anhydrides.

Coatings of both the succinylated and phthalated gelatin are prepared on photographic base along with unreacted gelatin for comparison. To each 100 ml of 6% w/w coating solution is added 0.5 ml of 1% formaldehyde solution and 1.5 ml of 6% by weight aqueous saponin solution. The coatings are then incubated at 50° C. and 70% R.H. (relative humidity) for 24 hours.

|  | Unmodified Gelatin | Succinylated Gelatin | Phthalated Gelatin |
|---|---|---|---|
| melting point | 100° C. | ≈34° C. | ≈34° C. |
| swell % | ca. 340 | ca. 1100 | ca. 1100 |

This shows that the modified gelatins are substantially unhardened by the formaldehyde solution and thus that substantially no free —NH$_2$— groups were present therein.

The following preparations will serve to illustrate the preparation of graft copolymers of use in the stripping layer of the present invention.

PREPARATION 35 g of succinylated gelatin was dissolved in 475 ml of distilled water contained in a flask fitted with a stirrer, thermometer, reflux condenser and nitrogen inlet and outlet. 25 ml of N-methyl pyrrolidine are added and the temperature raises to 75° C. by placing the flask in a water bath. Nitrogen is then passed for 30 minutes. 1.4 g of 4,4′-azobis(4-cyanovaleric acid) are added and after 2 minutes 50 g of n-butyl acrylate. The mixture is then stirred for 1.5 hours at 75° C. under nitrogen. The graft composition is then filtered and dialysed for 48 hours to remove unreacted monomer and initiator. This is graft polymer 1.

Similar preparations are carried out using the same amount of succinylated gelatin but other monomers, the amounts being set forth in the following table.

In the case of graft polymer 11 a similar preparation is carried out using 35 g phthalated gelatin and 50 g vinyl acetate.

TABLE 1

| No. | Graft Polymer | Wt. Ratio |
|---|---|---|
| 1 | succinylated gelatin:n-butyl acrylate | 1:1.44 |
| 2 | succinylated gelatin:n-butyl acrylate | 1:1 |
| 3 | succinylated gelatin:n-butylmethacrylate | 1:1.44 |
| 4 | succinylated gelatin:n-butylmethacrylate | 1:1 |
| 5 | succinylated gelatin:vinyl acetate | 1:1.44 |
| 6 | succinylated gelatin:vinyl acetate | 1:1 |
| 7 | succinylated gelatin:vinyl acetate | 1:0.5 |
| 8 | succinylated gelatin:vinyl benzoate | 1:1.44 |
| 9 | succinylated gelatin:vinyl benzoate | 1:1 |
| 10 | succinylated gelatin:vinyl benzoate | 1:0.5 |
| 11 | phthalated gelatin:vinyl acetate | 1:1.44 |

The homopolymer content is determined by extracting with boiling acetone for 24 hours. Graft polymer content is determined by acid hydrolysis or enzymatic degradation.

TABLE 2

| Graft Polymer No. | Total Polymer % | % Homopolymer | % Grafted |
|---|---|---|---|
| 1 | 59 | 29 | 30 |
| 2 | 50 | 21 | 29 |
| 3 | 58.5 | 42.7 | 15.8 |
| 4 | 49.9 | 39.7 | 10.2 |
| 5 | 58.6 | 22.22 | 36.4 |
| 6 | 48.8 | 19.4 | 29.4 |
| 7 | 25.5 | 0.00 | 25.5 |
| 8 | 45.0 | 17.0 | 28.0 |
| 9 | 37.97 | 12.95 | 25.02 |
| 10 | 33.53 | 9.18 | 24.35 |
| 11 | 57.2 | 20.1 | 37.1 |

Example

A receiving sheet is prepared by coating a subbed cellulose acetate support with a mordant composition consisting of 70 ml of 10% aqueous gelatin, 40 ml of 7.5% aqueous solution of copoly (styrene-N-maleimidopropyl-N,N-dibutyl-N-methyl ammonium-p-toluene sulphonate), 2 ml 30% by weight aqueous formaldehyde and 4 ml of 6% by weight of aqueous saponin solution. The coating weight is 60 mg/dm$^2$. This is overcoated with the graft polymer 7 to give a stripping layer of coating weight 100 mg/dm$^2$.

A yellow dye forming coupler γ-benzoyl-γ-(3-octadecylcarbonyl phenylthio)3,5-dicarboxyacetanilide is incorporated into a gelatin silver bromoiodide emulsion coating containing 18 mg coupler per dm², 20 mg silver per dm² and 60 mg of gelatin per dm². This is coated over the stripping layer.

Samples of the coating are exposed to a negative and developed for 5 minutes at 75° C. using a colour developer of the following composition:

| | |
|---|---|
| benzyl alcohol | 10.0 cc |
| ascorbic acid | 0.2 g |
| potassium bromide | 0.7 g |
| sodium carbonate . H₂O | 20.0 g |
| sodium hydroxide | 2.0 g |
| 4-Amino-N-ethyl-N-(β-hydroxyethyl) aniline | 10.0 g |
| water to make | 1 liter |

The dry adhesion of both the emulsion layer to the stripping layer and the stripping layer to the mordant layer is good. When wet the stripping layer can easily be removed along with the emulsion layer. The adhesive force required, measured by the knife stripping technique, is 10 g/cm.

The soluble acid dye formed during development by reaction of the coupler with the oxidised developing agent is transferred to and satisfactorily mordanted by the mordant layer.

The quality of the received image is good, the loss in definition being no more than predicted for the diffusing distance.

Adhesion Test
(Knife stripping method based on Hesiometer, see ref. IXth Fatipec Congress, 1968)

TABLE 3

| No. | Stripping Layer Composition (Graft Polymer) | Wt. Ratio | Wet Adhesion | Dry Adhesion |
|---|---|---|---|---|
| 1 | succinylated gelatin: n-butylacrylate | 1:1.44 | 30 g/cm | + |
| 2 | succinylated gelatin: n-butylacrylate | 1:1 | 20 | + |
| 3 | succinylated gelatin: n-butylmethacrylate | 1:1.44 | 4.6 | − |
| 4 | succinylated gelatin: n-butylmethacrylate | 1:1 | 10 | + |
| 5 | succinylated gelatin: vinyl acetate | 1:1.44 | 11.5 | + |
| 6 | succinylated gelatin: vinyl acetate | 1:1 | 14 | + |
| 7 | succinylated gelatin: vinyl acetate | 1:0.5 | 5 | + |
| 8 | succinylated gelatin: vinyl benzoate | 1:1.44 | 7 | − |
| 9 | succinylated gelatin: vinyl benzoate | 1:1 | 6 | + |
| 10 | succinylated gelatin: vinyl benzoate | 1:0.5 | 4.6 | + |
| 11 | phthalated gelatin: vinyl acetate | 1:1.44 | 12 | + |
| 12 | succinylated gelatin (for comparison) | — | 0 | − |
| 13 | phthalated gelatin (for comparison) | — | 0 | − |

Legend:
− : dry adhesion failure, tape pull off test
+ : good dry adhesion
(Dry adhesion test - razor cuts made on surface of strip contact adhesive tape applied and torn away.)

I claim:

1. A photographic assembly which comprises at least one photosensitive layer and an image receiving layer in which after exposure and processing an image is formed by an imagewise diffusion of a substance or substances from the photosensitive layer or layers, or a layer in operative contact therewith and a support, there being present between the photosensitive layer or layers and the said image receiving layer a stripping layer consisting of a graft copolymer of gelatin where, in the gelatin, all the primary amino groups are blocked by the gelatin fully reacted with a dicarboxylic acid anhydride selected from phthalic anhydrides, succinic anhydrides and glutaric anhydrides in alkaline medium and a monomer of a vinyl ester, a vinyl ether, an acrylic ester, an acrylic ether, a methacrylic ester or a methacrylic ether or a mixture thereof, the proportion of reacted gelatin to monomer in the graft copolymer being from 1 gelatin to 0.25 monomer by weight to 1 gelatin to 1.5 monomer by weight, there being optionally other layers present in the photographic assembly between the lowest photosensitive layer and the image receiving layer, the said stripping layer being present between two gelatin based layers.

2. A photographic assembly according to claim 1 wherein the photosensitive layer or layers are gelatin based.

3. A photographic assembly according to claim 2 wherein the photosensitive layer is a gelatino silver halide emulsion layer.

4. A photographic assembly according to claim 1 wherein the dicarboxylic acid anhydride used in the preparation of the graft copolymer is a succinic anhydride of the formula

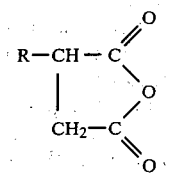

a phthalic anhydride

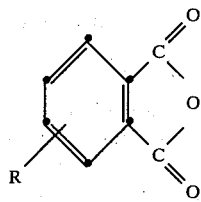

or a glutaric anhydride

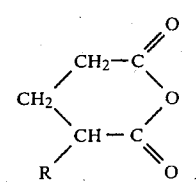

wherein R denotes hydrogen, alkyl, halogen or —SO₃M.

5. A photographic assembly according to claim 4, wherein R denotes hydrogen, methyl, ethyl, chlorine, bromine or —SO₃M and M is a hydrogen or sodium ion.

6. A photographic assembly according to claim 1 wherein the monomer used in the preparation of the graft copolymer is a vinyl ester of the formula $$CH_2=CR_1-O\overset{O}{\underset{\|}{C}}-R_2,$$

a vinyl ether of the formula $CH_2=CR_1-OR_2$, an acrylic ester of the formula $$CH_2=CR_1\overset{O}{\underset{\|}{C}}-OR_2$$

or a methacrylic ester of the formula $$CH_2=CR_1\overset{O}{\underset{\|}{C}}-OR_2,$$

wherein $R_1$ is hydrogen or methyl and $R_2$ is alkyl having from 1 to 4 carbon atoms or an aromatic ring.

7. A photographic assembly according to claim 6, wherein $R_2$ is methyl, ethyl, n-propyl, n-butyl or phenyl.

8. A photographic assembly according to claim 1 wherein the monomer used in the preparation of the graft copolymer is n-butyl acrylate, n-butylmethacrylate, vinyl acetate or vinyl benzoate.

* * * * *